R. W. HARDIE.
METHOD OF HUMIDIFYING AIR.
APPLICATION FILED OCT. 11, 1919.

1,336,225.

Patented Apr. 6, 1920.

Inventor
Robert W. Hardie

UNITED STATES PATENT OFFICE.

ROBERT W. HARDIE, OF WHITE PLAINS, NEW YORK, ASSIGNOR TO R. W. HARDIE COMPANY, INC., A CORPORATION OF NEW YORK.

METHOD OF HUMIDIFYING AIR.

1,336,225.

Specification of Letters Patent.

Patented Apr. 6, 1920.

Original application filed November 27, 1918, Serial No. 264,481. Divided and this application filed October 11, 1919. Serial No. 330,123.

*To all whom it may concern:*

Be it known that I, ROBERT W. HARDIE, a citizen of the United States, residing at White Plains, in the county of Westchester and State of New York, have invented new and useful Improvements in Methods of Humidifying Air, of which the following is a specification.

This invention is a division of that specified in the application filed by me November 27, 1918, Serial Number 264,481.

The invention has for one of its objects to provide a method whereby aqueous vapor may be produced and diffused into an indoor atmosphere and whereby the quantity of vapor produced and diffused into the atmosphere may be regulated and controlled.

The invention has for its further object to provide a method whereby the vapor produced may be diffused into an indoor atmosphere in a facile, practical and economical manner.

The accompanying drawings illustrate an apparatus adapted to be used for carrying out the method embodying my invention; other means having similar capabilities may be used, however, without departing from the invention.

Figure 1:
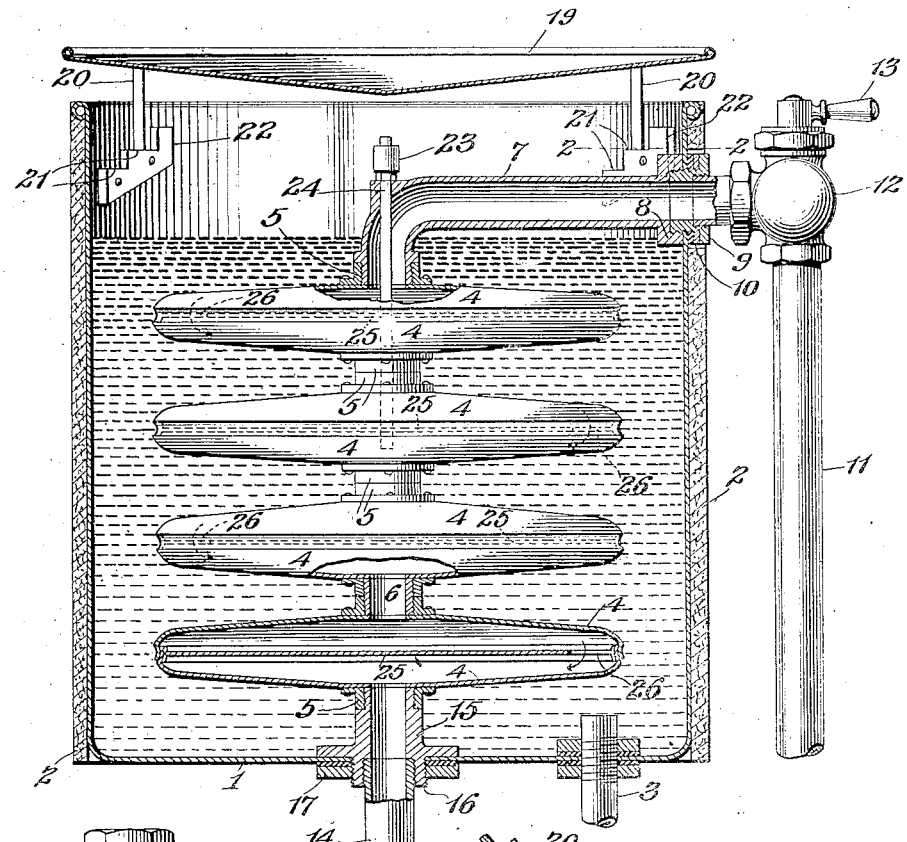

In the drawings Figure 1 is a vertical transverse section of an open topped receptacle containing a supply of water, and a side elevation, partly in vertical section, of a heater within the receptacle, and pipe and valve connections shown in side elevation.

Figure 2:
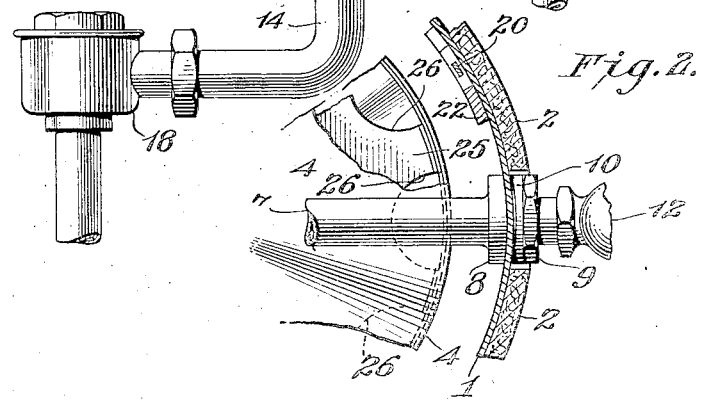

Fig. 2 is a horizontal fragmentary section partly broken away, taken on the line 2—2 of Fig. 1.

In the drawings, like figures of reference indicate like parts throughout the different views.

In carrying out the invention, a body of water is exposed to an indoor atmosphere, preferably within an open-topped receptacle. Heat is applied to the interior of the body of water, and the water is converted into aqueous vapor, which arises from the surface of the water and becomes diffused into the atmosphere, thereby increasing the relative humidity thereof.

At certain seasons of the year, or when the method is applied to special commercial purposes, it is desirable and often necessary to increase or decrease the amount of vapor added to the atmosphere and in order to provide for such conditions the supply of vapor is controlled largely by varying the extent of area within which the direct effective heat is applied to the interior of the body of water. To that end, while the width of the area within which the heat is applied to the interior of the body of water is preferably maintained constant, the height or depth of said area is increased when the supply of vapor is to be increased, and decreased when the supply is to be diminished.

In that manner the quantity of heat supplied to the water is regulated and controlled independently of the pressure or temperature of the heating medium, and as a consequence, the quantity of vapor arising from the body of water is controlled and regulated and the desired relative humidity of the indoor air is established and maintained.

The area within which the direct effective heat is applied, as the expression is used herein, means the area actually occupied by the heating medium within a casing, and the area of the body of water adjacent to that part of the casing directly affected by the heating medium, and does not refer to any part of the casing not actually containing any part of the heating medium, although such part of said casing may indirectly receive some heat from the heating medium.

The method may be more readily comprehended when considered in connection with the apparatus illustrated in the accompanying drawings which is to be understood as being one of several kinds of apparatus that may be used in carrying out the invention.

The apparatus illustrated, consists of an open-topped receptacle 1, adapted to contain a body of water to be heated and vaporized, and the receptacle may be provided, if desired, with a coating 2, of some non-heat-conducting material as asbestos to keep the heat of the water from radiating from the wall of the receptacle.

Water may be supplied to the interior of the receptacle by means of a pipe 3, connected with a source of supply, or may be supplied by hand.

Within the receptacle there is a heater comprising one or more sections each made up of two corresponding plates or disks 4, having interiorly threaded collars 5 secured to said disks; the collars of two adjacent sections being secured together by means of threaded nipples 6, engaging the threads of said collars. An inlet pipe 7 is connected at its inner end with the upper end of the heater and is provided on its outer end with an interiorly threaded head 8, that receives the exterior thread of a bushing 9. The bushing 9 extends in part through an aperture in the wall of the receptacle, and clamps and holds a washer 10 against said wall. A supply pipe 11 is connected with a modulating valve 12, having an operating and regulating handle 13. A return or discharge pipe 14 is connected with the lower end of the heater and may be provided with a thermostatic trap 18.

A baffle and heating plate 19 extends over the top of the receptacle, and is so constructed that its under surface extends downward and inward from its outer margin, so that any vapor that may condense on the underside of said plate will drip back into the receptacle. The plate 19 is provided with arms 20, the lower ends of which are supported upon steps 21 or brackets 22, so as to enable the plate 19 to be adjusted vertically relative to the top of the receptacle and enlarge or contract the opening between the outer margin of said plate and the upper edge of said receptacle, and thereby increase or decrease the quantity of vapor passing out from the receptacle.

An air valve 23 is secured to a hub connected with, or formed on the inner end of the inlet pipe 7, and is connected with a pipe 24 that extends downward within the heater to permit the escape of air therefrom.

Baffle plates 25 having their outer edges cut away, or provided with apertures 26, may be used within the sections of the heater, with their edges clamped by the outer margins of the plates 4.

The heater should be of sufficient height to allow a heating medium such as steam or vapor to fill only a part of the whole of the interior of the heater. In carrying out the method of the invention, steam or vapor is used as a heating medium and passes into the upper part of the heater through the supply pipe 11 connecting with a source of supply, and through the modulating valve 12 and inlet pipe 7.

The modulating valve may be opened to only one fourth of its full capacity, or to such an extent as to fill the top section only of the heater. Modulating or controlling valves of ordinary construction are provided with indicating marks or figures, and the handle of the valve is provided with a finger or pointer which when turned with the handle indicates by reference to said markings, the extent to which the valve port is opened. As the steam or vapor is lighter than the air, it will remain in the top section of the heater and condense there, giving off its heat to the water in the receptacle, and in that case the effective direct heating area as meant by this invention will be the area radiating heat directly into the water from the heating medium, which in the instance last referred to would be the area of the top section of the heater.

The water of condensation from the steam or vapor used, will flow from the top section of the heater through the three next lower sections of the heating member and pass out of the said member, and through the thermostatic trap 18. Some heat will be produced thereby in the three next lower sections; but not heat direct from the heating medium and not effective in limiting or localizing the heating medium for the purpose of this invention, and therefore that heat is not considered as part of the direct and effective heating area.

In other words the direct and effective heating area referred to herein, is the area that has the heating medium directly back of or adjacent to it.

Again the modulating valve may be opened to one half of its full capacity or to such an extent as to fill only the upper two sections of the heating member, and the direct effective heating area in that case will be the area of those two sections. And similarly the valve may be opened to such an extent as to fill the upper three sections, or all of the sections, with the heating medium.

As the direct effective heating area is increased the heat in the water is likewise increased and the vaporization as well, consequently the relative humidity of the indoor atmosphere is raised.

When the direct effective heating area is decreased, the opposite effect is produced, and by increasing or decreasing the direct effective heating area vaporization may be established and maintained as desired.

What I claim as new and desire to secure by Letters Patent is—

1. The method of humidifying air, consisting in exposing a body of water to the atmosphere, converting the water into vapor by the application of a heating medium thereto, and in controlling the amount of vapor arising from the water by regulating the vertical extent of area in the water within which the heating medium is directly applied, independently of any variation in the water level.

2. The method of humidifying air, consisting in exposing a body of water to the atmosphere, converting the water into vapor by the application of a heating medium thereto, and in varying the amount of vapor arising from the water by regulating the extent of area within the water to which the heating medium is applied, independently of any variation in the water level.

3. The method of humidifying air, consisting in exposing a body of water to the atmosphere, converting the water into vapor by the application of a heating medium thereto, and in controlling the extent of area within the water to which the heating medium is applied, independently of any variation of the water level.

ROBERT W. HARDIE.

Witnesses:
D. LEWIS MATTERN,
M. C. LYDDANE.